United States Patent Office 3,411,815
Patented Nov. 19, 1968

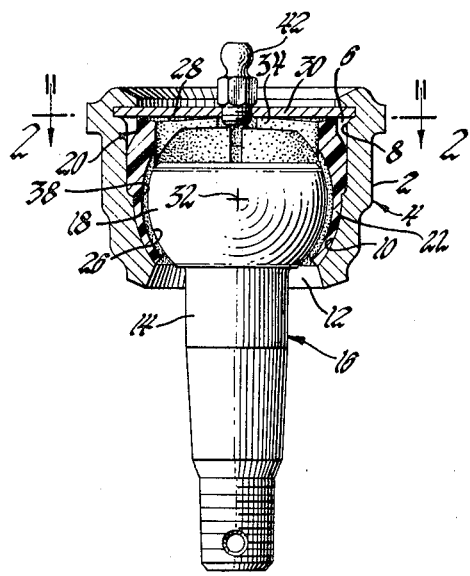
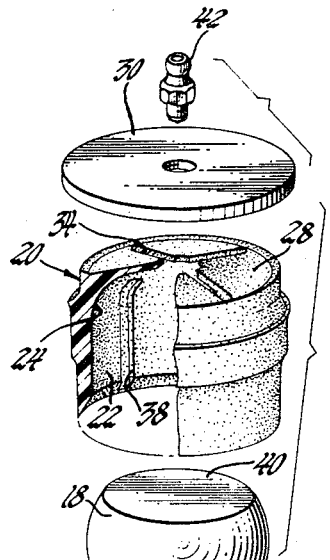
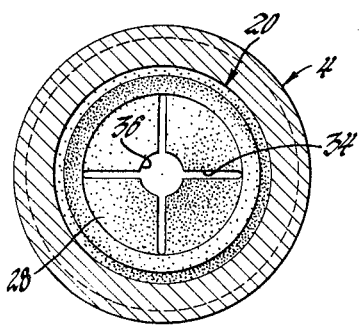
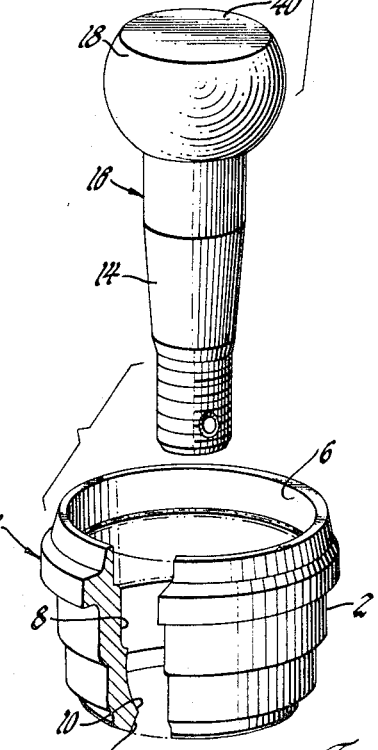
Fig. 1
Fig. 2
Fig. 3
INVENTOR.
Leo S. Sullivan, Jr.
BY
W. F. Wagner
ATTORNEY

3,411,815
BALL JOINT ASSEMBLY
Leo S. Sullivan, Jr., Dayton, Ohio, assignor to General Motors Corporation, Detroit, Mich., a corporation of Delaware
Filed July 21, 1967, Ser. No. 655,236
4 Claims. (Cl. 287—87)

ABSTRACT OF THE DISCLOSURE

A ball and socket joint is provided with a plastic bearing member disposed between the ball and socket which includes an integral Belleville spring portion acting, when subjected to axial pressure as an incidence of assembly, to exert a preload force tending to compensate for manufacturing tolerances and wear in service.

---

Numerous forms of ball joint assemblies exist in the prior art, one of the most common of which involves an arrangement wherein the ball portion of the ball stud is surrounded by a casing having one end thereof formed to define a parti-spherical inner wall corresponding to the spherical surface of the ball. The remainder of the socket portion is generally cylindrical and the end of the casing is closed by a cap structure which is either removably secured thereto or permanently assembled as by staking or spinning over a peripheral portion of the end of the casing. In many instances, this type of assembly incorporates a preformed synthetic resin bearing liner which is pressed into the socket and forms an annular wall between the socket and ball to provide suitable low friction characteristics with respect to oscillatory movement of the ball stud relative to the casing. In the past, it has been customary to form such liners with an opening at one end sufficiently large to allow the ball to be inserted into the liner and the ball and liner then subsequently pressed into the casing. In such constructions, additional separate elements, usually in the form of a spring and bearing plate reacted between the casing cap structure and the ball to compensate for initial variation in stack-up tolerances and exert a constant axial load tending to maintain the ball in mating engagement with the liner.

An object of the present invention is to provide a ball joint assembly of the general type described providing simplified construction and improved precision qualities.

Another object of the invention is to provide a ball joint construction of the general type described incorporating a plastic bearing liner including integral deformable portions which upon assembly of the joint initially operate to compensate for variations attributable to normal manufacturing tolerances and subsequently exert a continuing biasing force tending to maintain the assembly in precision engagement.

The foregoing and other objects, advantages and features of the invention will become more fully apparent as reference is had to the accompanying specification and drawing wherein:

FIGURE 1 is a side elevational view, partly in section, illustrating a ball joint assembly incorporating the invention;

FIGURE 2 is a sectional plan view looking in the direction of arrows 2—2 of FIGURE 1; and FIGURE 3 is an exploded view of the assembly illustrated in FIGURE 1.

Referring now to the drawing and particularly FIGURE 1, there is shown a ball joint assembly in which the reference numeral 2 generally designates a casing having a stepped cylindrical outer wall 4 adapted for insection in a suitable opening of a member not shown, such as for example a suspension control arm. Casing 2 is formed with an inner socket portion 6 which includes an upper cylindrical surface of revolution 8 and a lower parti-spherical surface of revolution 10, the latter of which terminates in an opening 12 through which extends the stud portion 14 of a ball stud element 16. The ball portion 18 of ball stud 16 in turn is disposed within socket 6 in spaced relation to surfaces of revolutions 8 and 10 by a preformed plastic bearing liner 20 formed of any suitable material such as acetal resin.

As seen best in FIGURE 3, the preformed bearing liner 20, prior to assembly in socket 6, includes a thin walled lower cylindrical portion 22 which merges with an upper parti-spherical portion 24 corresponding generally to the spherical shape of ball 18. Initially, liner 20 is disposed over ball head 18 and then pressed into socket 6. As the liner is displaced downwardly in socket 6, the thin walled portion 22 follows the curvature of surface of revolution 10 to establish a lower parti-spherical bearing surface 26 corresponding to the preformed upper parti-spherical bearing surface 24. As further seen in FIGURES 1 and 3, liner 20 includes an integral domed end wall 28 which upon assembly of cap structure 30 is biased downwardly toward a flat condition thereby producing an elastic force tending to maintain the liner in socket 6 and in intimate bearing engagement with ball 18.

According to a principal feature of the invention, the degree of deformation to which the domed portion is susceptible is sufficient to compensate for normal variation in manufacturing tolerances of the various parts of the assembly. Thus, any significant variation in the distance between the installed position of cap structure 30 and the position of the geometric center 32 of the ball 18 when properly seated in liner 20 is accommodated due to the fact that the dome portion 28 acting as a Belleville spring is deflected only sufficiently to secure the requisite precision relationship and thereafter acts as a continuous biasing medium for maintaining precision fit during the service life of the assembly. To this end, the cross-sectional dimension of the liner 20 in and adjacent to the dome portion is significantly greater than the cross sectional dimension of the thin wall portion 22 surrounding the lower portion of the ball so that the force required to completely flatten the dome portion is greater than the assembly force required to form thin wall section 22 around the ball.

In accordance with another feature of the invention, to insure uniform load distribution circumferentially of the liner, as seen best in FIGURE 2, the dome portion is provided with a plurality of slots 34 radiating outwardly from a central aperture 36. Similarly, thin wall portion 22 is formed with circumferentially spaced slots 38 to accommodate cold forming thereof into the parti-spherical form assumed in the installed position.

It will also be noted that slots 38 extend vertically of liner 20 above the level of the flat top 40 of ball 18 and, therefore, provided channels for receiving lubricant introduced through fitting 42 in cap structure 30.

From the foregoing, it will be seen that a novel and improved ball joint assembly has been provided which enables elimination of separate parts previously required while maintaining the ability to absorb variation in manufacturing tolerances and to compensate for wear.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. A ball joint assembly comprising, a casing forming an open ended cylindrical socket portion at one end merging with a parti-spherical socket portion at the other end thereof, means forming an aperture in said parti-spherical portion, a ball stud member including a ball portion disposed within said socket and a stud portion extending through said aperture, an annular plastic bearing member disposed between said socket and said ball portion, and a substantially flat cap structure closing the open end of said casing, said bearing member including an integral domed end wall adjacent said cap structure spaced from and converging away from said ball which is partially deflected about its outer circumference axially toward the ball and a flatter condition by engagement with said cap structure while still maintaining a convergence away from the ball and permanently spaced from the ball so as to maintain a continuous preload on said assembly operating to eliminate variation in precision fit by absorbing manufacturing tolerances and wear occurring during the service life of the assembly.

2. The invention of claim 1 wherein said bearing member is formed of molded acetal resin, portions of which are cold-formed around said ball by the biasing force exerted by said domed end wall.

3. A molded synthetic plastic liner for a ball joint assembly of the type having a casing surrounding a ball member, which casing is formed with a socket having a cylindrical portion merging with a parti-spherical portion, said liner comprising a cup-like member having a side wall defining an outer surface of revolution of stepped cylindrical form, an inner surface of revolution progressively merging from a cylindrical form at an open lower end to a parti-spherical form near an upper end wall, said upper end wall of said member converging toward the axis of said side wall and away from said open lower end to define a Belleville spring configuration, said lower end of said liner being deformable upon axial insertion into said socket to a parti-spherical configuration mating with said ball portion and with said parti-spherical portion of said socket, and said Belleville spring portion being axially deflectable inwardly about its otuer circumference toward a flatter condition while maintaining its Belleville spring configuration so as to maintain a preload on said assembly assuring initial precision fit and gradual wear take-up during the service life of the assembly.

4. The invention of claim 3 including circumferentially spaced grooves formed on the inner face of said lower end terminating above the level at which said ball maintains mating engagement with said parti-spherical form.

References Cited

UNITED STATES PATENTS 2,993,716    7/1961    Langen.
3,063,744    11/1962    Flumerfelt.

CARL W. TOMLIN, *Primary Examiner.*

ANDREW KUNDRAT, *Assistant Examiner.*